United States Patent
Hesse et al.

(10) Patent No.: US 6,556,906 B1
(45) Date of Patent: Apr. 29, 2003

(54) METHOD FOR CONTROLLING HEAT FLOWS IN A MOTOR VEHICLE

(75) Inventors: Ullrich Hesse, Affalterbach (DE); Walter Lehr, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/869,810
(22) PCT Filed: Oct. 17, 2000
(86) PCT No.: PCT/DE00/03656
§ 371 (c)(1), (2), (4) Date: Oct. 16, 2001
(87) PCT Pub. No.: WO01/34953
PCT Pub. Date: May 17, 2001

(30) Foreign Application Priority Data

Nov. 6, 1999 (DE) .......................... 199 53 511

(51) Int. Cl.⁷ .......................... G06F 7/00; F28F 27/00; F01P 7/00
(52) U.S. Cl. ...................... 701/36; 123/41.02; 165/201; 165/202; 165/236; 165/271
(58) Field of Search .................. 701/36, 49; 123/41.01, 123/41.02, 41.52, 41.58, 677, 678; 236/1 C, 25 R, 25 A; 165/11.1, 200, 201, 202, 236, 241, 242, 271, 41, 42, 43, 44, 45

(56) References Cited

U.S. PATENT DOCUMENTS 5,553,661 A 9/1996 Beyerlein et al. ............ 165/203
5,666,911 A * 9/1997 Gohl et al. ............... 123/41.54

FOREIGN PATENT DOCUMENTS

| EP | 0 811 757 | 12/1997 |
| EP | 0 974 742 | 1/2000 |
| GB | 2 323 682 | 9/1998 |

OTHER PUBLICATIONS

Technical Academy at Esslingen "Automatic Climatic System and Ergonomics"–Course No. 21751/67.059 of December 12/13, 1996.

* cited by examiner

Primary Examiner—Jacques H. Louis-Jacques
(74) Attorney, Agent, or Firm—Kenyon & Kenyon

(57) ABSTRACT

A method and a device for the control/regulation of the heat flows caused by heat generators and heat consumers in a motor vehicle, at least on the basis of a momentary load state of the motor vehicle engine and the momentary vehicle operating conditions and ambient conditions. A control/regulation device makes a forecast of the load state of the engine cooling system lying ahead, on the basis of a model that takes into consideration driving condition-relevant quantities and the thermal inertia of the engine cooling system and of engine load-relevant ambient conditions lying ahead, recorded by a satellite navigation system, and carries out a corresponding control/regulation of all heat flows in the motor vehicle, especially of the engine cooling system.

13 Claims, 1 Drawing Sheet

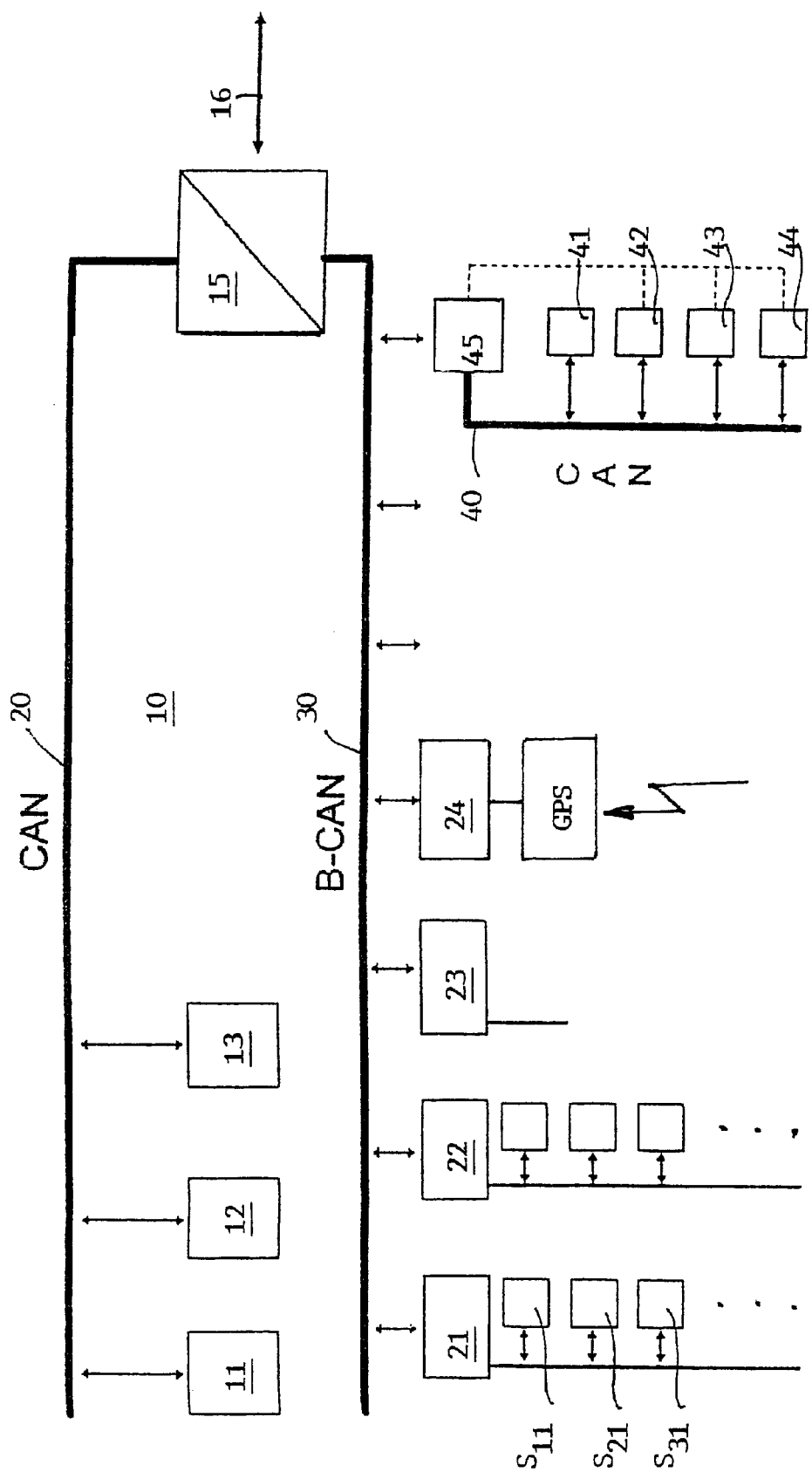
FIGURE

METHOD FOR CONTROLLING HEAT FLOWS IN A MOTOR VEHICLE

FIELD OF THE INVENTION

The present invention relates to a method for controlling/regulating heat flows produced by heat generators and heat consumers in a motor vehicle, at least on the basis of a present load condition of the motor vehicle engine and present vehicle operating and ambient conditions.

BACKGROUND INFORMATION

Such a method is known from a set of lecture notes of the Technical Academy at Esslingen, "Automatic Climatic System, Electronics and Ergonomics", Course No. 21751/67.059 of Dec. 12 and 13, 1996, read at an event at Ostfildern (near Nellingen).

In general, the thermal management of a motor vehicle contains the control and activation of all heat flows occurring in the motor vehicle. In order to be able to set the optimal operating conditions as fast as possible, all heat generators and heat consumers have to be controlled or activated and their heat flows have to be conducted and controlled corresponding to need and priority. One aim here is a reduction in the use of motor fuel, for instance by higher cooling medium temperature in partial load operation, a minimization of exhaust emissions and an improvement of the luxury features, e.g. by the quickest possible reaction of interior heating. Because of the thermal inertia of the internal combustion engine and the engine cooling system, a prediction of imminent load conditions of the engine would be desirable.

In the method known from the above lecture notes, an automatic climate control system relies on a computational model generated from actual disturbance variables. With the use of this model, the quantities of heat brought into and out of a vehicle's interior space, and the quantities of heat brought to and from an evaporator and/or radiator are checked and controlled in consideration of the aforementioned computational model of the control unit, on the basis of sensorily recorded, actual measuring values by the generation or correction of disturbance variables for climate control.

At this time no solutions are known which would use load-relevant conditions lying ahead, as, for example, road condition, gradient, length of gradient or number of curves in the stretch of road lying ahead of the vehicle in its direction of travel, for an anticipatory thermal management, i.e. the checking and controlling of all the heat flows in the vehicle.

SUMMARY OF THE INVENTION

In view of that, it is an object of the present invention to provide a method, and a device to carry out this method, for controlling/regulating heat flows produced in a motor vehicle by heat generators and heat consumers, in such a way that a foresighted thermal management, especially of the engine cooling system, can lead to a manner of operation that is optimized with regard to consumption and/or emission and or luxury features.

According to one important aspect, a method according to the present invention is provided in that, additionally, a prediction is made of the engine cooling system's load condition, on the basis of the model taking into account variables relevant to the travel conditions and the thermal inertia of the engine cooling system and of recorded load-relevant ambient conditions lying ahead in the travel direction, and control/regulation of the heat flows in the motor vehicle, and particularly of the engine cooling system, is performed, taking into account these operating states and ambient conditions.

A plurality of individual possibilities or even a combination of these are available for recording the engine-load relevant ambient conditions lying ahead.

For one thing, ambient conditions lying ahead can be recorded from the signals delivered by a GPS system.

For another thing, the ambient conditions lying ahead can be acquired from signals which are recorded by a stored cartographical ambient model.

Thirdly, ambient conditions lying ahead can also be transmitted to the vehicle by radio from a fixed or mobile earthbound station.

From navigational technology for earthbound vehicles a method is already known for updating stored cartographical data, e.g. the course a road takes, the gradient, etc, by data received by a mobile or fixed earthbound station or by a GPS system via satellite.

The engine-load relevant ambient conditions lying ahead, which are important in the method according to the present invention, include especially uphill slopes, downhill slopes, stretches of road having many curves, level stretches and probable vehicle stop situations.

A device suitable for carrying out this method of thermal management of at least the motor vehicle's engine cooling system includes, according to the present invention, a controlling/regulating device set up to carry out the method according to the present invention.

Of course, the method according to the present invention includes not only the thermal management of the engine cooling system, but also covers checking and control of all heat flows in the motor vehicle, including those heat flows going to or coming from the air conditioning unit, and including all heat flows stored in or released from thermal accumulators such as phase change material devices for the storage of heat or coldness.

Motor vehicle air conditioning equipment can thus be checked and controlled by a functional connection to the control/regulation device, installed for carrying out the method according to the present invention, in such a way that the respective operating points for optimal operating conditions can be set quickly.

Such air conditioning equipment can have an input/output device, for instance, on the motor vehicle's dashboard, for the input of driving intentions and display of operating conditions of the air conditioning equipment.

The aforementioned functional connection of the air conditioning equipment to the control/regulating device, installed for carrying out the method according to the present invention, can be made by using a vehicle body bus connection which is also connected to sensors and other vehicle control devices, in particular to a GPS receiver.

For instance, the well known CAN (controller area network) bus system is such a vehicle body bus.

Using the method and the device for carrying it out, according to the present invention, one can take advantage of data on travel conditions that are expected to take place, while taking under consideration the thermal inertia of the engine cooling system, for thermal management that is optimal at all times of heat generators and users in motor vehicles, not only the engine cooling system.

BRIEF DESCRIPTION OF THE DRAWING

The FIGURE shows a block diagram of a plurality of control units in operative connection via a motor vehicle bus architecture.

DETAILED DESCRIPTION

Control units 11, 12, 13 (not part of the present invention) are connected by CAN bus 20 for management tasks concerning the engine, transmission, chassis and safety. The CAN bus 20 is connected via a gateway node 15, on the one hand to a B-CAN bus 30, and on the other hand to a diagnostic interface 16.

The B-CAN bus 30 connects, for example a control unit 21, used to carry out the method for thermal management of the engine cooling system according to the present invention, a control unit 22 for the air conditioning equipment, a control unit 23 for the seat electronics and a control unit 24 for preparation of the data supplied by a GPS receiver. A further CAN bus 40 can be provided for connecting a central video screen 45 with input/output components 41, a radio receiver 42, a television receiver 43, a navigational system 44 based on stored cartographic data.

As mentioned before, data on road conditions ahead, as, for instance, upward slopes, length of the slopes or the number of curves can be recorded by the GPS receiver and/or the navigational system 44 and passed on at least to control unit 21 via the B-CAN bus 30, so that the control unit 21 can carry out a foreward-looking thermal management of the engine cooling system, under consideration of an operating manner of the vehicle engine that is optimized with respect to fuel consumption, emission and (the use of) luxury features.

The radio receiver 42 and/or the television receiver 43 can also receive data for predicting load-relevant ambient conditions lying ahead, such as, for instance, road conditions, frequency of curves, stretches of uphill and downhill grades in the road, and can pass them along at least to control unit 21, which, in addition to the sensorily recorded present load condition of the motor vehicle engine and the present vehicle operating condition and ambient condition, also makes a prediction on load conditions of the engine cooling system, on the basis of a model of the engine cooling system, taking into consideration vehicle condition-relevant quantities and the thermal inertia, and also on the basis of the recorded engine load-relevant ambient conditions, and then sets the actuating mechanisms, in operative connection with it, for a corresponding control/regulation of the engine cooling system.

The control/regulating unit 22, responsible for the control/regulation of the vehicle air conditioning equipment, can also receive such ambient conditions lying ahead, as are given, for instance, by the data delivered by the GPS system and/or navigational system 44, and can additionally monitor or control the heat flows in the motor vehicle, influenced by the air conditioning equipment, in the sense of the aforementioned, foresighted thermal management.

Finally, it should be mentioned that an adaptive driver model (not shown in the FIGURE), which takes into consideration the behavior of the driver, can also have an influence on the forward-looking thermal management at least of the engine cooling system, and optionally the air conditioning equipment as well.

What is claimed is:

1. A method for controlling heat flows produced by heat generators and heat consumers in a motor vehicle, comprising:

making a forecast of upcoming load conditions of an engine cooling system of the motor vehicle, as a function of a model that considers quantities relevant to a driving condition and a thermal inertia of the engine cooling system, and of recorded load-relevant ambient conditions that lie ahead in a direction of travel; and controlling heat flows in the motor vehicle as a function of present vehicle operating states and ambient conditions, a present load condition of an engine of the motor vehicle, and the forecast of the upcoming load conditions of the engine cooling system.

2. The method according to claim 1, wherein the heat flows in the engine cooling system are controlled.

3. The method according to claim 2, wherein the control of the heat flows is a further function of optimizing parameters for the vehicle engine with regard to at least one of a fuel use, an emission, and a use of luxury features.

4. The method according to claim 1, further comprising recording the ambient conditions that lie ahead from signals delivered by a GPS system.

5. The method according to claim 1, further comprising recording the ambient conditions that lie ahead from signals delivered by a stored cartographic ambient model.

6. The method according to claim 1, further comprising receiving in the motor vehicle the ambient conditions that lie ahead, the ambient conditions being transmitted by radio from one of a fixed and a mobile earthbound station.

7. The method according to claim 1, wherein the ambient conditions that lie ahead include at least one of: uphill slopes, downhill slopes, stretches having frequent curves, level stretches, and probable vehicle stopping situations.

8. A device for thermal management of heat flows in a motor vehicle, comprising:

a control device making a forecast of upcoming load conditions of an engine cooling system of the motor vehicle, as a function of a model that considers quantities relevant to a driving condition and a thermal inertia of the engine cooling system, and of recorded load-relevant ambient conditions that lie ahead in a direction of travel, the control device controlling heat flows in the motor vehicle as a function of present vehicle operating states and ambient conditions, a present load condition of an engine of the motor vehicle, and the forecast of the upcoming load conditions of the engine cooling system.

9. The device according to claim 8, wherein the control device controls the heat flows of the engine cooling system.

10. An air conditioning system of a motor vehicle, comprising:

a control device making a forecast of upcoming load conditions of an engine cooling system of the motor vehicle, as a function of a model that considers quantities relevant to a driving condition and a thermal inertia of the engine cooling system, and of recorded load-relevant ambient conditions that lie ahead in a direction of travel, the control device controlling heat flows in the motor vehicle as a function of present vehicle operating states and ambient conditions, a present load condition of an engine of the motor vehicle, and the forecast of the upcoming load conditions of the engine cooling system;

sensors operationally coupled to the control device; and actuating mechanisms operationally coupled to the control device.

11. The air conditioning system according to claim 10, further comprising an input/output device situated on a dashboard of the motor vehicle for an input of driver commands and for a display of operating states of the air conditioning system.

12. The air conditioning system according to claim 10, further comprising a vehicle body bus connection for connecting the control device, the sensors and other control devices in the motor vehicle.

13. The air conditioning system according to claim 12, wherein the vehicle body bus connection is a CAN bus.

* * * * *